July 28, 1931.  A. HNATEK  1,816,083
NATURAL COLOR CINEMATOGRAPHY
Filed Aug. 23, 1926

A. Hnatek
Inventor

By: Marks & Clerk
Attys

Patented July 28, 1931

1,816,083

UNITED STATES PATENT OFFICE

ADOLF HNATEK, OF VIENNA, AUSTRIA

NATURAL COLOR CINEMATOGRAPHY

Application filed August 23, 1926, Serial No. 131,048, and in Austria July 22, 1926.

The present invention consists in a two part rotatable screen for use in the method of three-color cinematography both for taking the exposures and for projecting in which only two of the three color-record images (red, green, blue) are taken at each exposure. The screen for taking comprises filtering sectors separated by opaque sectors and, divided into two concentric annular parts, one of said annular parts having the same color in all the sectors, while the other annular part comprises the two other colors, which occur in opposite sectors of the said annulus. Thus, both in taking the photograph and in projecting by this screen two of the images are obtained at each exposure (at each projection) and the color producing the greatest amount of flickering, say, "red", occurs each time when photographing two of the three images, while the two other colors ("green" and "blue") are used in alternation and change from one pair of images to the next, a consecutive series of images red-green, red-blue, red-green, red-blue, red-green being obtained.

The accompanying drawings show by Figs. 1, 2, 3 and 4 four forms of rotating color screen disc in accordance with the present invention.
When making an exposure according to the present method a rotating selective screen (Fig. 1) will be used, which is provided between two opaque sectors D, which screen the change of image, with two concentric annular filtering parts, one of which, for instance the inner one, is provided with filters of the same color A (for instance "red"), while in the other, in the present instance the outer annulus, the two other colors B and C (for instance "green" and "blue") are opposed to one another.

Figure 1:
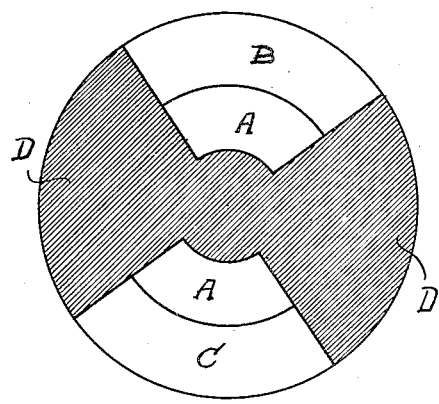
Figure 2:
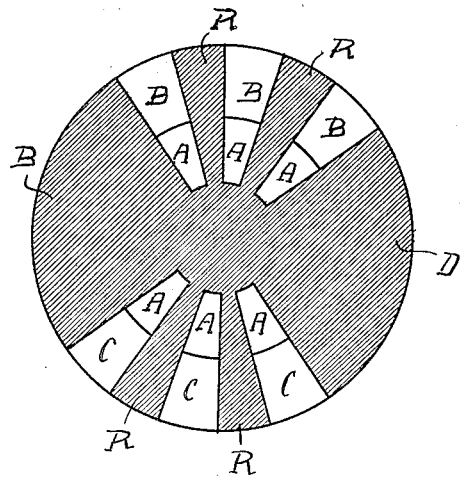
Figure 3:
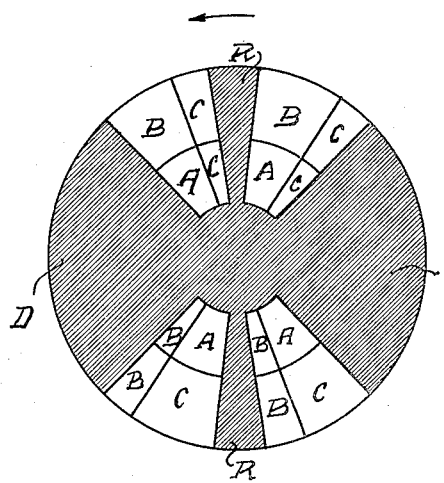
Figure 4:
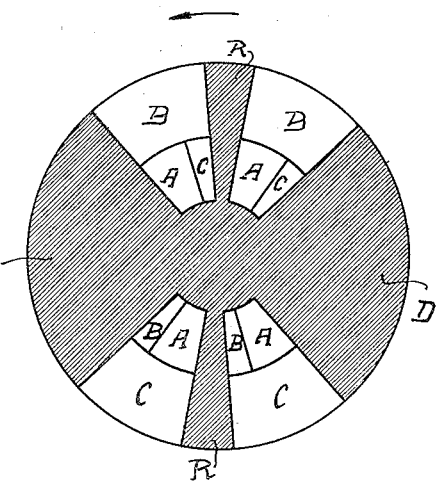

A disc as illustrated by Fig. 1 can be used also for projecting. According to a modified embodiment for projecting purposes the sectors provided with the filters are preferably subdivided by one or more readily opaque ribs R (Fig. 2) with the object of increasing the number of alternations between light and dark in a known manner.
Finally, in order to remove slight colouring of the projected images at their edges in the case of light objects having a rapid transverse motion, the well known method may be adopted of each time when projecting a pair of images making additional use as auxiliary color, of the third color not used in taking this pair of images. As in practice either both images in the gate will be made use of for projecting with the auxiliary color foreign to the said images, (a selective projecting screen of this kind is shown in Fig. 3) or, in order to modify the excess of color due to the continuous projection of the said color, only that image will be used, the color A of which recurs in each pair of images (see Fig. 4), it follows that the characteristic feature of such selective screens for projecting purposes referred to above and illustrated by Figs. 3 and 4 consists in this, that in a complete revolution of the screen all three fundamental colors will appear in one annulus of the filter but only two in the other.

By taking exposures the areas of the colors are inverse proportional to the sensitiveness of the film for the different colors. In projecting a film taken in this manner, the areas of the colors can be the same for all colors. If an auxiliary color is used for projecting purposes, the area (the sector) of such color is much smaller than the area (the sector) of the main colors by which this image is taken.

What I claim is:

1. A two-part rotatable red, green, blue screen for three-color cinematography, in which only two of the three color-record images are taken at each exposure, said screen comprising filtering sectors separated by opaque sectors and divided into two concentric annular parts, one annular part having only one of the said three colors in all its sectors, the other annular part comprising the two other colors, which occur separated from one another and in opposite sectors of the annular part.

2. A two-part rotatable red, green, blue projecting screen for three-color cinematography, in which only two of the three color-record images are taken at each exposure, said screen comprising filtering sectors separated by opaque sectors and divided into two concentric annular parts, one annular part having only one of said three colors in all its sectors, the other annular part comprising the two other colors, which occur separated from one another and in opposite sectors of the annular part, and additional opaque sectors, which subdivide all the filtering sectors into a plurality of smaller sectors.

3. A two-part rotatable red, green, blue projecting screen for three-color cinematography, in which only two of the three color-record images are taken at each exposure, said screen comprising filtering sectors separated by opaque sectors and divided into two concentric annular parts, one annular part having one of the three-colors in all its sectors, the other annular part comprising the two other colors, which occur separated from one another and in opposite sectors of the annular part and in one of the annular parts filtering sectors in the third color, not used in taking the pair of images, as auxiliary color.

4. A two-part rotatable red, green, blue projecting screen for three-color cinematography, in which only two of the three color-record images are taken at each exposure, said screen comprising filtering sectors separated by opaque sectors and divided into two concentric annular parts, one annular part having one of the three colors in all its sectors, the other annular part comprising the two other colors, which occur separated from one another and in opposite sectors of the annular part and in both annular parts filtering sectors in the third color, not used in taking the pair of images, as auxiliary color.

In testimony whereof I have signed my name to this specification.

ADOLF HNATEK.